(12) United States Patent
Zhang et al.

(10) Patent No.: US 6,505,163 B1
(45) Date of Patent: Jan. 7, 2003

(54) NETWORK AND METHOD FOR PROVIDING AN AUTOMATIC RECALL TELECOMMUNICATIONS SERVICE WITH AUTOMATIC SPEECH RECOGNITION CAPABILITY

(75) Inventors: Zeeman Zhang, Marietta, GA (US); Joseph Knoerle, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 155 days.

(21) Appl. No.: 09/634,794

(22) Filed: Aug. 9, 2000

(51) Int. Cl.[7] .................. G10L 21/06; G10L 15/22; H04M 9/08; H04M 1/56
(52) U.S. Cl. ............ 704/275; 704/270; 704/231; 704/251; 379/406.03; 379/142.01; 379/142.06
(58) Field of Search ............... 704/251, 270.1, 704/275, 270, 231; 379/88.01, 216.01, 205.01, 406.03, 142.01–142.06; 370/389

(56) References Cited

U.S. PATENT DOCUMENTS

| | | | |
|---|---|---|---|
| 5,206,901 A | 4/1993 | Harlow et al. | 379/211 |
| 5,430,719 A | 7/1995 | Weisser, Jr. | 370/389 |
| 5,438,568 A * | 8/1995 | Weisser | 370/389 |
| 5,553,119 A * | 9/1996 | McAllister et al. | 704/275 |
| 5,583,920 A | 12/1996 | Wheeler, Jr. | 379/221.09 |
| 5,724,411 A | 3/1998 | Eisdorfer et al. | 379/211.03 |
| 5,724,481 A * | 3/1998 | Garberg et al. | 704/251 |
| 5,732,187 A * | 3/1998 | Scruggs | 704/251 |
| 5,812,652 A * | 9/1998 | Jodoin et al. | 379/205.01 |
| 5,822,727 A * | 10/1998 | Garberg | 704/270.1 |
| 5,898,917 A * | 4/1999 | Batni et al. | 379/216.01 |
| 5,903,726 A | 5/1999 | Donovan et al. | 709/206 |
| 5,905,954 A | 5/1999 | Nguyen | 455/435 |
| 5,915,220 A | 6/1999 | Chelliah | 455/435 |
| 5,940,493 A | 8/1999 | Desai et al. | 379/223 |
| 5,943,409 A * | 8/1999 | Malik | 379/205.01 |
| 5,987,411 A * | 11/1999 | Petroni et al. | 704/251 |
| 5,991,364 A | 11/1999 | McAllister et al. | 379/229 |
| 6,094,476 A * | 7/2000 | Hunt et al. | 704/275 |
| 6,167,376 A * | 12/2000 | Ditzik | 704/275 |
| 6,240,174 B1 | 5/2001 | Silver | 379/230 |
| 6,301,350 B1 | 10/2001 | Henningson et al. | 379/220 |
| 6,192,340 B1 * | 2/2002 | Abecassis | 704/275 |
| 6,377,662 B1 * | 4/2002 | Hunt et al. | 704/275 |

FOREIGN PATENT DOCUMENTS

EP 000592150 A1 * 9/1993 ............. G10L/5/06

* cited by examiner

*Primary Examiner*—Richemond Dorvil
*Assistant Examiner*—Daniel Nolan
(74) *Attorney, Agent, or Firm*—Kirkpatrick & Lockhart LLP

(57) ABSTRACT

A network for providing a telecommunications service with automatic speech recognition to a telecommunications user, including a switch in communication with a telecommunications device associated with the telecommunications user for storing identifying information regarding a prior calling party to the telecommunications user, and for detecting a trigger specific to the service in response to a communication from the telecommunications device, and an intelligent resource server in communication with the switch for receiving from the switch the communication from the telecommunications device and a message including the identifying information, for playing an audible message for the telecommunications user in response to receiving the communication, the audible message containing the information regarding the prior calling party and prompting the telecommunications user to place an outgoing communication to the prior calling party, and for automatically recognizing a predetermined keyword spoken by the telecommunications user in response to the audible message.

23 Claims, 9 Drawing Sheets

NETWORK AND METHOD FOR PROVIDING AN AUTOMATIC RECALL TELECOMMUNICATIONS SERVICE WITH AUTOMATIC SPEECH RECOGNITION CAPABILITY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to communications networks and, more particularly, to networks and methods for providing calling services with automatic speech recognition capability.

2. Description of the Background

Automatic recall service, also known as call return or *69, is a popular calling service offered by many telecommunications service providers. Automatic recall service typically allows a customer to dial a special feature code to receive an enunciation of the telephone number, and perhaps name, of the last incoming caller. The customer is then typically audibly presented the option of calling back the directory number associated with the last incoming call by dialing another special code. Thus, a customer may use the automatic recall service to screen his or her calls, or when the customer is unable to answer a call before the calling party hangs up. The automatic recall service may also be used when a customer does not know the directory number of that caller, but wants to call back the last incoming caller.

According to another popular call screening-type service, typically referred to as the "calling name service," a called party may be presented with the name and/or directory number of a calling party visually, such as with a display unit including an LCD display, or audibly, by voicing the pertinent information to the called party over the telephone interface. The called party may then route the incoming call as desired by dialing certain codes. For example, the called party may dial one code to accept the incoming call, another code to reject the call, and yet a third code to, for example, route the call to a voice-mail messaging system.

According to either of these exemplary enhanced calling features, however, the customer is required to dial a code to realize certain benefits of the service. For instance, according to the call return feature, the called party is required to dial a code to call back the directory number associated with the last incoming call. Similarly, for the calling name party, the called party is required to dial a code to route the incoming call as desired.

Mandating that customers dial certain codes to realize the benefits of calling services to which they subscribe is not ideal for certain applications. For example, wireless telephone users may be unable to dial codes on their wireless telephones because their hands may be occupied with other tasks, such as driving. Similarly, the hands of personal computer (PC) users may be occupied with tasks such as typing, which do not facilitate the manual dialing of codes on a telephone.

Accordingly, there exists a need for a manner in which telecommunications customers may realize the benefits of enhanced calling features and services without the manual dialing of codes.

BRIEF SUMMARY OF INVENTION

The present invention provides a practical implementation for allowing telecommunications customers to speak predetermined voice commands over their telephone to realize the benefits of enhanced calling features and services, thus obviating the need to manually dial feature codes, which is required in the prior art. The present invention may be utilized in conjunction with either landline or wireless telephones. In addition, the present invention may be implemented to provide such voice command functionality for such popular telecommunications services as the calling name service, the flexible call forwarding service, the automatic recall service (also called call return or "*69"), call screening services, the name and number delivery service (commonly referred to as directory assistance or "411"), and a user interface for the simultaneous ring service.

According to one embodiment, the present invention is directed to a network for providing a telecommunications service with automatic speech recognition to a telecommunications customer. The network includes a switch in communication with a telecommunications device associated with the telecommunications customer and an intelligent resource server in communication with the switch. The switch may be an SSP switch of a central office (CO) of an Advanced Intelligent Network (AIN) in communication with, for example, a landline telephone of the telecommunications customer via a subscriber line or, according to another embodiment, may be a switch of a Mobile Switching Center (MSC) of a wireless network in communication with a wireless telephone via an air-interface communication scheme. The switch may detect certain triggering events resulting from communications to or from the telecommunications device of the customer, and route the communications to the intelligent resource server in response to detection of the triggers. To facilitate routing of the communications from the switch to the intelligent resource server, the AIN or the wireless network may include a Service Control Point (SCP), which provides instructions to the switch to route the communications through the network in accordance with the particular telecommunications service being provided.

The intelligent resource server includes, among other things, an enunciation module and an Automatic Speech Recognition (ASR) module. In response to receiving a communication from the switch, the enunciation module of the intelligent resource server may play an audible message for one of the parties to the communication, which for some services may be the calling party and for others may be the called party, prompting the party to enter a character with their telephone or speak a certain word over their telephone in response to the message to realize the benefits of the particular service. In response to the message, if the party voices the keyword, the ASR module automatically detects the spoken keyword and, in response thereto, the intelligent resource server may implement the service in accordance with the instructions associated with the spoken keyword. In addition, the intelligent resource server may include a Dual Tone MultiFrequency (DTMF) decoder module for determining whether the party hearing the message entered the requested DTMF character in response to the message. Similarly, if the DTMF character is detected in response to the message, the intelligent resource server may implement the service in accordance with the instructions associated with the recognized DTMF character.

For example, for an embodiment of the network providing the automatic recall service, a telecommunications customer may dial a feature code to access the name and/or telephone number of a previous caller. The switch may detect the feature code, and the call may be routed from the switch to the intelligent resource server. A message may also be provided to the intelligence resource server including the recall-related information, i.e., the name and/or telephone number of the previous party. The enunciation module may play an audible message for the customer identifying the name/number of the previous caller. The enunciation module may then play a message for the customer prompting the customer to place an outgoing call to the previous caller. For example, the enunciation module may play a message for the customer instructing the customer to press or speak the number "one" to place an outgoing call to the previous caller. In response to this exemplary message, if the intelligent resource server recognizes the utterance of one of the keyword by the called customer or if one of the requested DTMF characters is detected, the intelligent resource server may place an outgoing call to the previous caller in accordance with the instructions associated with the detected keyword or DTMF character.

Thus, with the present invention, telecommunications customers may realize the benefits of popular telecommunications services without having to manually enter codes with their telephones. Consequently, persons whose hands are occupied, such as from typing or driving, may enjoy the benefits of these services without having to cease performing their hand-occupying tasks.

These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a communication network. For example, certain operating system details and modules of certain of the intelligent platforms of the network are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
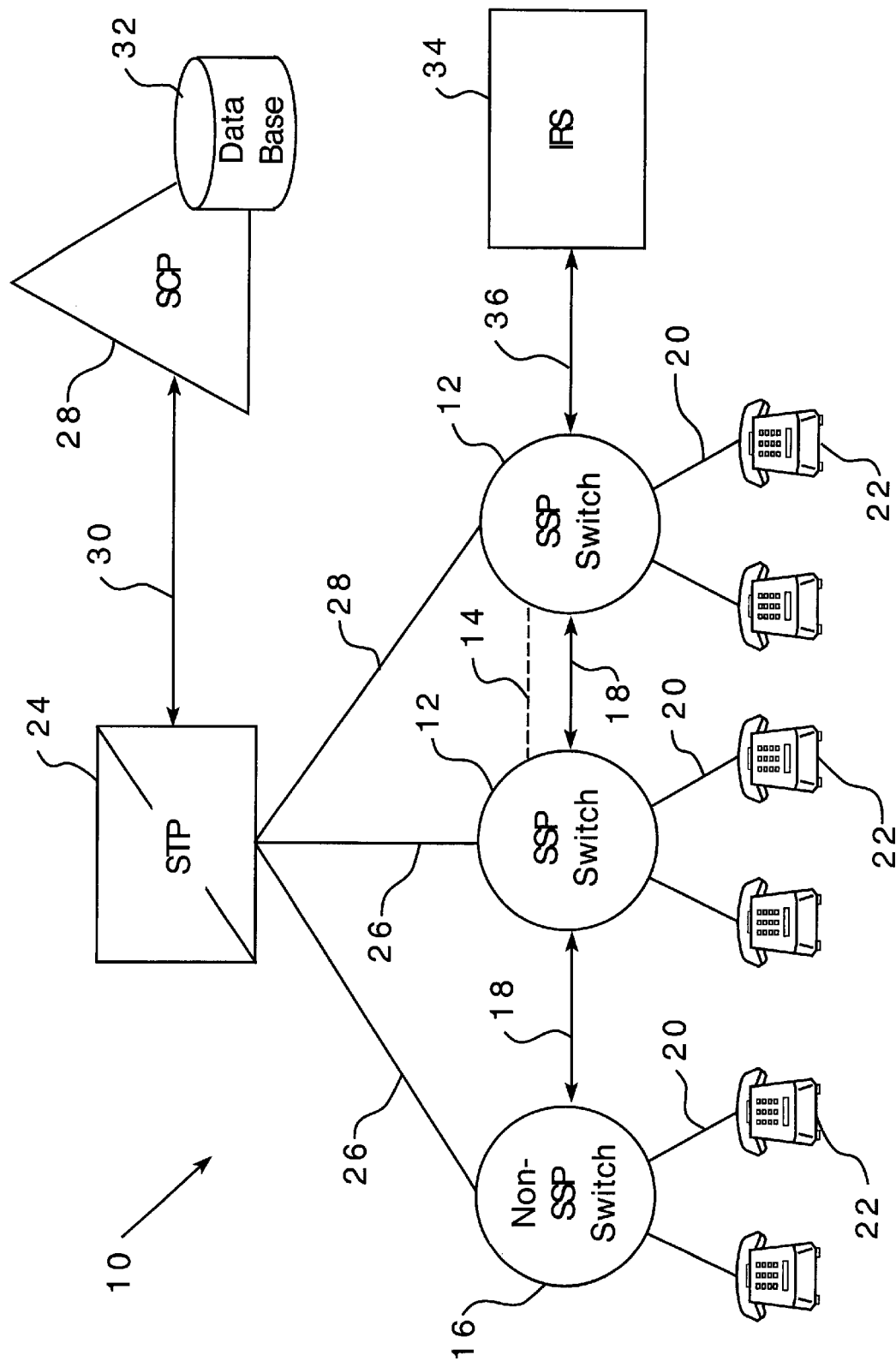
FIG. 1 is a block diagram of an Advanced Intelligent Network (AIN) for integration with a public switched telephone network.

FIG. 1 is a block diagram of an Advanced Intelligent Network (AIN) 10 for integration with a public switched telephone network (PSTN). The AIN 10 may be employed by a Local Exchange Carrier (LEC) servicing a Local Access and Transport Area (LATA) of the PSTN, and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18, which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order often thousand to one hundred thousand lines. Each of the subscriber lines 20 is connected to a terminating piece of customer premises equipment, represented in FIG. 1 by the landline telephones 22. Alternatively, the terminating equipment may be, for example, a telecopier, a personal computer, a modem, or a private branch exchange (PBX) switching system.

For the AIN 10 illustrated in FIG. 1, each SSP switch 12 and the non-SSP switch 16 is connected to a signal transfer point (STP) 24 via a communication link 26. The communication link 26 may employ, for example, an SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as Service Program Applications (SPA), which are run by the SCP 28. The SCP 28 is normally employed to implement high volume routing services, such as call forwarding and 800 number translation and routing. The SCP 28 may also be used for maintenance of and providing access to the network databases for authorization of billing, such as credit card validations. In addition, another of the functions of the SCP 28 is maintenance of the network database 32, which may store subscriber information, such as subscriber call management profiles, used in providing enhanced calling services. Such enhanced calling services may include call return, calling name, call forwarding, call screening and blocking, in addition to many other such services.

The AIN 10 illustrated in FIG. 1 also includes an intelligent resource server (IRS) 34. The IRS 34 may be, for example, a service node such as a Compact Service Node (CSN) available from Lucent Technologies Inc., Murray Hill, N.J., although the IRS available 34 may be any other AIN-compliant IRS such as, for example, an AIN/IP (Intelligent Peripheral) IRS from Nortel Networks Corp., Montreal, Quebec. The IRS 34 may be connected to one or more of the SSP switches 12 via a communications link 36, which may be, for example, an Integrated Service Digital Network (ISDN) including BRI (Basic Rate Interface) or PRI (Primary Rate Interface) lines. According to other embodiments, the communications link 36 may be, for example, a T-1 trunk circuit.

The IRS 34 may be used primarily when some enhanced feature or service is needed that requires an audio connection to the call such as, for example, the call return and calling name services, or when transfer of a significant amount of data to a subscriber over a switched connection during or following a call is required. Similar to the SCP 28, the intelligent functionality of the IRS 34 may be realized by program applications executable by the IRS 34, as described hereinbelow with reference to FIG. 2.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28. The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as result of a customized calling service or enhanced feature. For example, for an enhanced calling feature requiring the capabilities of the IRS 34, the return message from the SCP 28 may include instructions for the SSP switch 12 to route the call to the IRS 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN 10.

The AIN 10 illustrated in FIG. 1 includes only one STP 24, one SCP 28, one network database 32, and one IRS 34, although the AIN 10 may further include an additional number of these components as well as other network components which not are included in FIG. 1 for purposes of clarity. For example, the AIN 10 may additionally include redundant STPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
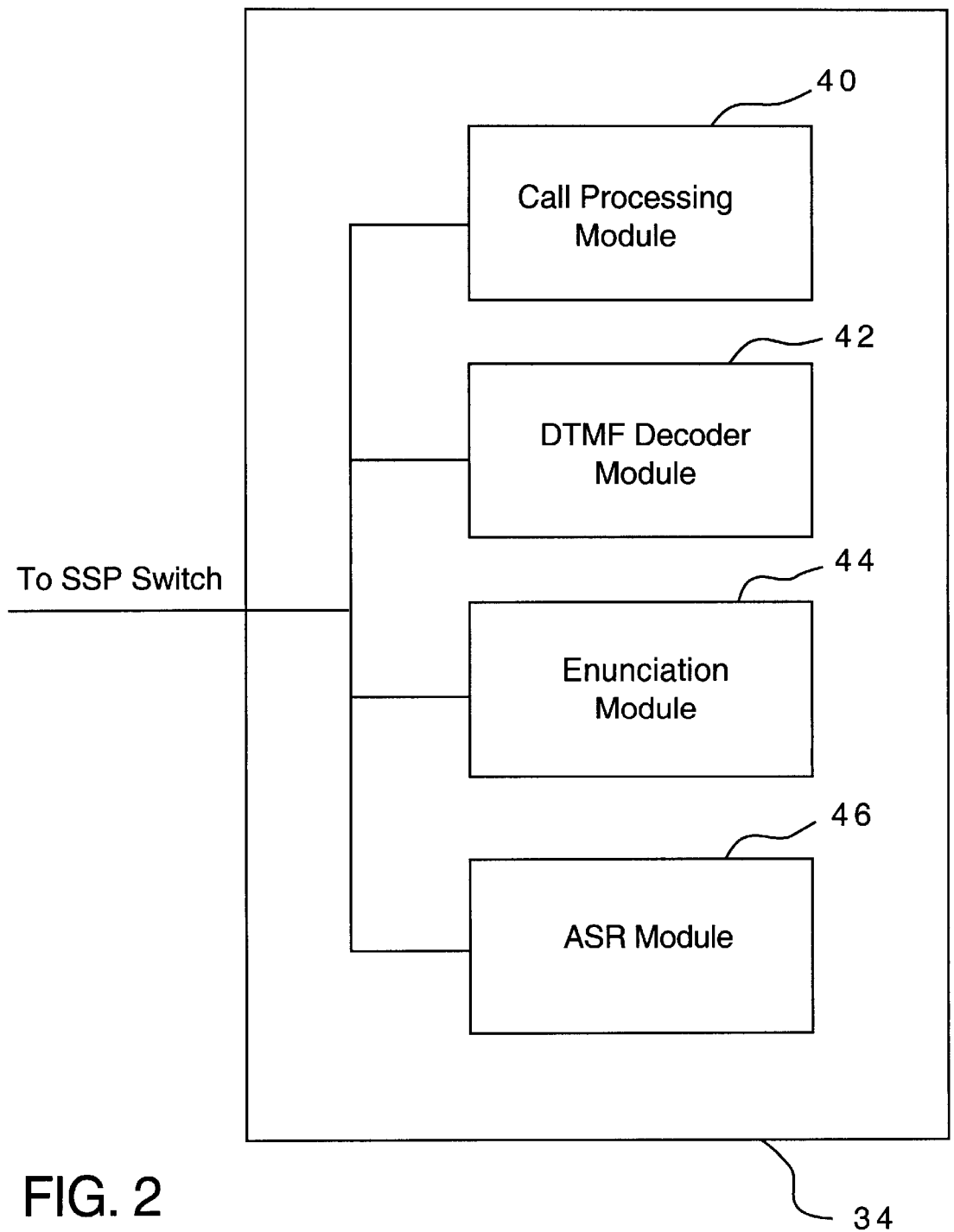
FIG. 2 is a block diagram of the intelligent resource server of the AIN of FIG. 1 according to one embodiment of the present invention.

FIG. 2 is a block diagram of the IRS 34 according to one embodiment of the present invention. The IRS 34 includes a call processing module 40 for receiving call processing commands and performing conventional call processing logic. The IRS 34 also includes a DTMF decoder module 42 for recognizing the dialing of Dual Tone MultiFrequency (DTMF) characters from, for example, a touch-tone telephone in communication with the IRS 34 via the AIN 10. In addition, the IRS 34 may include an enunciation module 44 and an Automatic Speech Recognition (ASR) module 46.

The enunciation module 44 may be programmed to enunciate voice output over the network 10 to a party using the telephone 22 (or any other telecommunications device in communication with the IRS 34). According to one embodiment, the enunciation module 44 may include text-to-speech translation capabilities to convert text into the voice output using speech synthesis techniques. The speech synthesis conversion techniques may convert text to speech in real time and without a predefined vocabulary. According to another embodiment, the enunciation module 44 may be implemented using a recorded voice file.

The ASR module 46 may be programmed to recognize certain predetermined keywords spoken by a party using the telephone 22 (or any other telecommunications device in communication with the IRS 34). The ASR module 46 may first digitize the spoken words and match them against a database of coded waveforms corresponding to the predetermined keywords. The ASR module 46 may be, for example, speaker-independent, and thus not require tuning and may be able recognize limited vocabularies such as numeric digits and a handful of words. The DTMF decoder module 42, the enunciation module 44, and the ASR module 46 permit the IRS 34 to mediate interaction between the caller and the applications executed by the IRS 34 in providing enhanced calling features for a customer, as described hereinbelow.

The modules 40, 42, 44, 46 may be implemented as software code to be executed by the IRS 34 using any type of computer instruction type suitable such as, for example, microcode, and can be stored in, for example, an electrically erasable programmable read only memory (EEPROM), or can be configured into the logic of the IRS 34. According to another embodiment, the modules 40, 42, 44, 46 may be implemented as software code to be executed by the IRS 34 using any suitable computer language such as, for example, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. In addition, the modules 40, 42, 44, 46 may be implemented from commercially-available software such as, for example, TTS and ASR software available from Lucent Technologies, Inc., Murray Hill, N.J.

Figure 3:
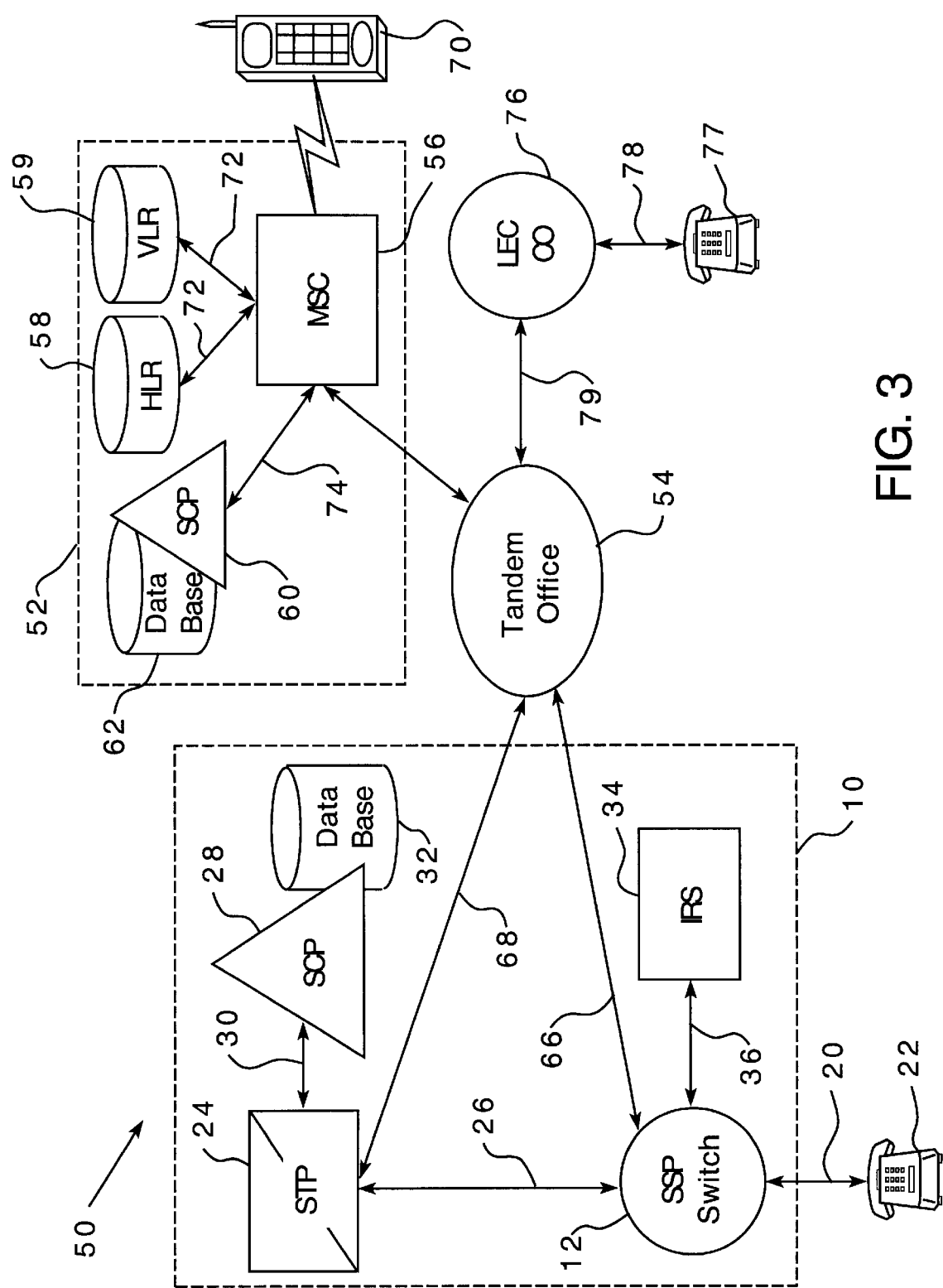
FIG. 3 is a block diagram of the communications network according to one embodiment of the present invention.

FIG. 3 is a block diagram of a network 50 according to one embodiment of the present invention. The network 50 includes the AIN 10 illustrated in FIG. 1, including the SSP switch 12, the STP 24, the SCP 28, and the IRS 34. For clarity, only one SSP switch 12, one STP 24, one SCP 28, and one IRS 34 are shown in FIG. 3 although, as discussed hereinbefore, the AIN 10 may include a multiple number of these components.

The network 50 also includes a wireless network 52 in communication with the AIN 10 via a tandem office 54. The wireless network 52 includes a Mobile Switching Center (MSC) 56, a Home Location Register (HLR) 58, a Visitor Location Register (VLR) 59, and a Service Control Point (SCP) 60 with an associated database 62. The MSC 56, HLR 58, VLR 59 and SCP 60 of the wireless network 52 may provide an intelligent wireless network capable of providing enhanced calling services and features for wireless subscribers, and which is the wireless complement to the landline-based AIN 10. According to one embodiment, the intelligent wireless network 52 may be a Wireless Intelligent Network (WIN), such as used in TDMA-based wireless networks, or a CAMEL network, such as used in CDMA-based wireless networks.

The tandem office 54 provides a switching interface between the PSTN and the wireless network 52. The tandem office 54 is in communication with the MSC 56 of the wireless network 52 via a communications link 64 employing, for example, an IS-41 signaling protocol. The a tandem office 54 may be in communication with the SSP switch 12 of the AIN 10 via a communications link 66, such as a trunk circuit. The tandem office 54 may also be in communication with the STP 24 of the AIN 10 via a communications link 68 employing, for example, an SS7 signaling protocol.

The MSC 56 is in communication with wireless telecommunications devices, such as the wireless telephone 70 via, for example, a base transceiver station (BTS) (not shown). The BTS may communicate with wireless telecommunications devices, such as the wireless telephone 70, according to an air-interface communication scheme such as, for example, AMPS (ANSI-553), TDMA (IS-136), CDMA (IS-95), or GSM. The BTS may be in communication with the MSC 56 via, for example, an ISDN or SS7 communications link. The MSC 56 is an automatic switching system in a wireless telecommunications network that acts as the interface for subscriber traffic between the wireless network 52 and the PSTN or other MSCs in the same or other wireless networks. The MSC 56 performs the same general function as a central office switch in a landline based system, except that the MSC 56 provides for incoming calls through a radio telecommunications front-end. Accordingly, the MSC 56 may include SSP switches (not shown) for detecting, for example, originating and terminating triggers.

The MSC 56 is in communication with the HLR 58 and the VLR 59 via communications links 72 which may, for example, be SS7 signaling protocol links. The HLR 58 and VLR 59 are location registers to which the user identity of a wireless telecommunications device, such as the wireless telephone 70, is assigned for record purposes. If the wireless telephone 70 is within its home location, the HLR 58 is assigned for record purposes. Conversely, if the wireless telephone 70 is in a visitor location, the VLR 59 is assigned for record purposes. The HLR 58 and VLR 59 may register subscriber information relating to the wireless telecommunications devices such as, for example, profile information, current location, and authorization period. When the MSC 56 detects a wireless telecommunications device entering the MSC's service area, the MSC 56 performs a registration process that includes requesting subscriber profile information from either the HLR 58 or the VLR 58 depending upon, as discussed hereinbefore, whether the wireless telephone 70 is within its home location or within a visitor location. The HLR 58 and VLR 59 may, or may not, be located within and be indistinguishable from the MSC 56, and may be distributed over more than one physical entity. In addition, one HLR 58 and one VLR 59 may serve more than one MSC 56.

The SCP 60 of the wireless network 52 is similar to the SCP 28 of the AIN 10, and contains the logic, which in conjunction with the network data stored in the associated database 62, is used to provide the enhanced calling services and features for wireless subscribers. The SCP 60 is in communication with the MSC 56 via a communications link 74, which may be, for example, an SS7 signaling protocol link. The SCP 60 receives query messages from the MSC 56, which may be routed through the MSC 56 from other network elements, and responds to the query, as described hereinbefore with respect to the SCP 28 of the AIN 10, in a manner appropriate to the query in the context of the enhanced calling service or feature. For example, the SCP 60 may return a message to the MSC 56 to route a communication to the IRS 34 via the tandem office 54 and the SSP switch 12.

The tandem office 54 may also provide a switching interface between the AIN 10 and another LEC central office (CO) 76. The LEC CO 76 may be a central office switch for the same LEC as the AIN 10, or the LEC CO 76 may be a central office switch for another LEC. The LEC CO 76 may include an SSP switch, and may be in communication with a landline telephone 77 via a subscriber line 78. The LEC CO 76 may be in communication with the tandem office 54 via a communications link 79, which may be, for example, a trunk circuit.

The communications network 50 of the present invention may be utilized to provided enhanced calling features and services with speech recognition capabilities, as described hereinbelow. Although the telephones 22, 70, and 77 are illustrated as the pieces of terminating equipment, those skilled in the art will understand that such pieces include other telecommunication units or devices such as, for example, facsimile machines, computers, and modems. The term "calling party" is used herein generally to refer to the person or device that initiates a communication. The calling party may also be referred to herein as "caller." In some cases, the calling party may not be a person, but may be a device such as a telecommunications device including a facsimile machine, answering service, modem, etc. The term "called party" is used herein generally to refer to the person or device that answers or responds to the call or communication. The term "subscriber" is used herein to generally refer to a subscriber of the one of the described calling features or services. The called party need not necessarily be the subscriber of a service, nor the party whom the caller is trying to reach. The term "communication" is used herein to include all messages or calls that may be exchanged between a calling party and a called party in the network 50 illustrated in FIG. 3, including voice, data and video messages. The term "communication" is used synonymously herein with the term "call" unless a distinction is noted.

Figure 4:
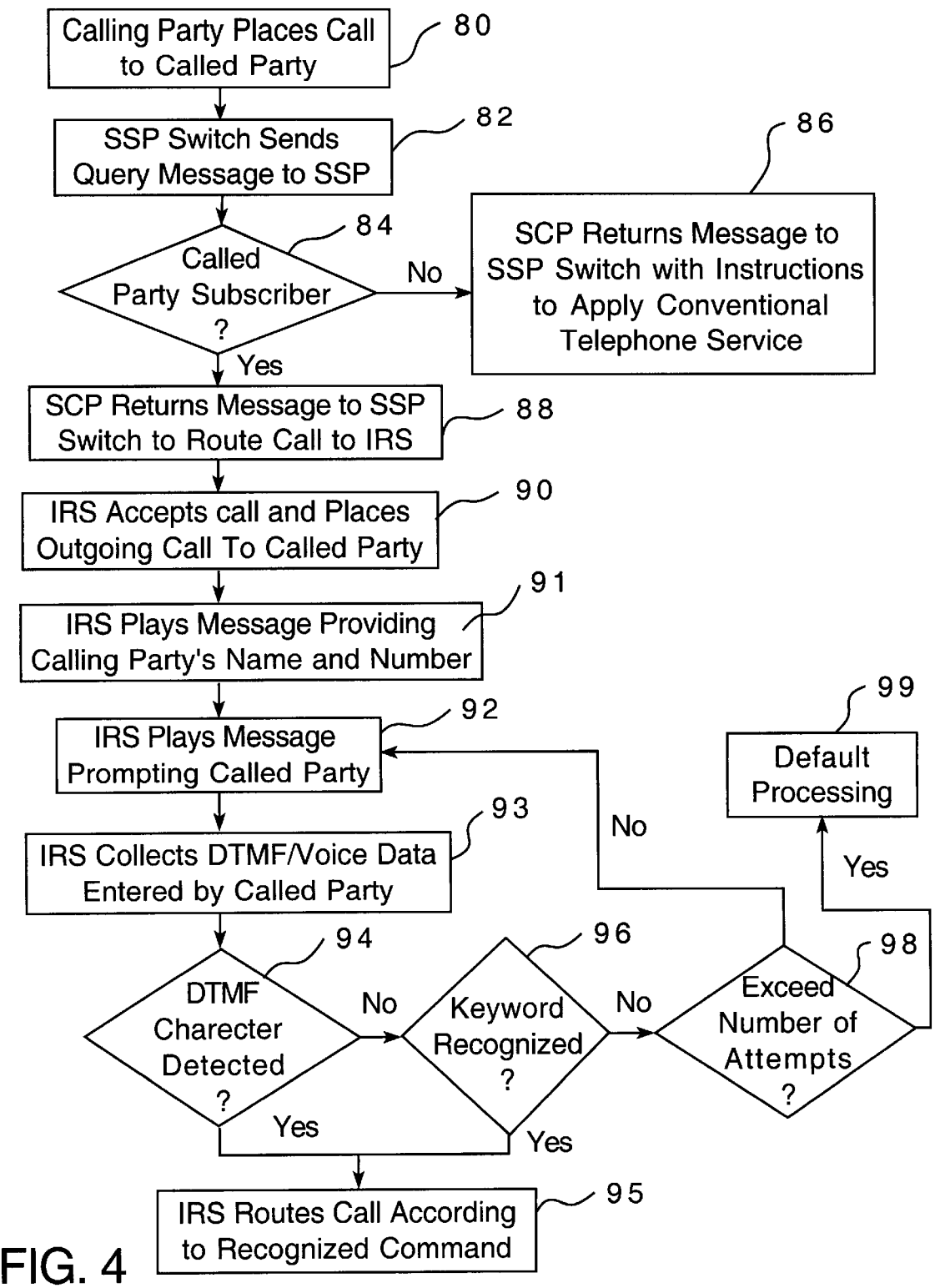
FIG. 4 is a block diagram illustrating a method of providing a calling name service with speech recognition with the network of FIG. 3 according to one embodiment of the present invention.

FIG. 4 is a block diagram illustrating an embodiment of how the network 50 may be utilized to provide the calling name service with speech recognition capabilities. The process starts at block 80, with a calling party placing a call to a called party. With reference to FIG. 3, for the purposes of the illustrated embodiment, the calling party is a user of the wireless telephone 70 or the landline telephone 77, and the called party is a user of the landline telephone 22, although according to other embodiments, the called party may be a user of the wireless telephone 70, as described hereinbelow. Calls from either the wireless telephone 70 or the landline telephone 77 are routed to the SSP switch 12 of the AIN 10 via the tandem office 54 according to conventional call processing. A terminating trigger at the SSP switch 12 specific to the calling name service is detected, causing the SSP switch 12 to send a query message to the SCP 28 at block 82. The query message may be, for example, a terminating attempt trigger (TAT) query message.

At block 84, in response to the query message from the SSP switch 12, the SCP 28 may interrogate the network database 32 as to whether the called party (i.e., a user of the telephone 22) is a subscriber to the calling name service. If the called party is not a subscriber, the process proceeds to block 86, where the SCP 28 returns a message to the SSP switch 12 with instructions to apply conventional telephone service. If, however, the called party is a subscriber, the process proceeds to block 88, where the SCP 28 returns a message to the SSP switch 12 with instructions to route the call to the IRS 34 of the AIN 10. The message may additionally include a message field including information as to the name and directory number of the calling party.

At block 90, the call processing module 40 of the IRS 34 accepts the call and places an outgoing call to the called party/subscriber, thereby causing the landline telephone 22 to start ringing, alerting the called party/subscriber of the incoming call. The placement of the outgoing call to the called party/subscriber from the call processing module 40 may be simultaneous with acceptance of the call from the SSP 12. After the called party/subscriber answers the call, at block 91, the enunciation module 44 of the IRS 34 plays an audible message for the called party/subscriber announcing, for example, the calling party's name and telephone number. The IRS 34 may have knowledge of the calling party's name and telephone number based on the message received from the SCP 28 via the SSP switch 12.

Next, at block 92, the enunciation module 44 may play an audible message asking the called party/subscriber to instruct the network 50 as to how to route the incoming call. For example, the message may request that the called party/subscriber dial the character "1" or speak the word "accept" to accept the incoming call, dial the character "2" or speak the word "reject" to reject the call, or dial the character "three" or speak the word "message" to route the call to a voice messaging system for the called party/subscriber.

Having asked the called party/subscriber to instruct the network 50 how to route the incoming call, the process continues to block 93 where the IRS 34 collects the DTMF and/or voice data transmitted by the called party in response to the message played at block 92. According to one embodiment, IRS 34 may provide a time window in which the data is to be entered. Thereafter, the process advances to block 94, as discussed hereinbelow.

The process then proceeds to block 94, where the DTMF decoder module 42 of the IRS 34 determines whether the called party/subscriber has dialed one of the requested characters. The DTMF decoder module 42 may determine whether the called party/subscriber has dialed one of the requested characters based on, for example, dual tone multi-frequency (DTMF) signal decoding of the data collected by the IRS at block 93. If the DTMF decoder module 42 detects of the requested characters, the process continues to block 95, at which the call processing module 40 of the IRS 34 routes the incoming call according to the call processing instructions associated with the character dialed by the called party/subscriber.

Conversely, if at block 94 the DTMF decoder module 42 does not detect one of the requested characters, the process continues to block 96, where the ASR module 46 of the IRS 34 determines, for example, whether a predefined keyword was spoken by the called party/subscriber in response to the message played at block 92. According to such an embodiment, the ASR module 46 may be programmed to recognize keywords from the data collected by the IRS 34 at block 93 such as, for example, "accept", "reject", or "message", which may be detected and recognized by the ASR module 46 as call processing instructions. If the ASR module 46 does detect a recognized keyword at block 96, the process flow continues to block 95, where the call processing module 40 routes the call according to the call processing instructions associated with the recognized keyword. Conversely, if a keyword is not recognized at block 96, the process advances to block 98, where the IRS 34 determines whether the called party has exceeded the number of allowable attempts to transmit an identifiable and appropriate response in response to the message played at block 92. If not, the process returns to block 92, where the message is replayed for the calling party. Conversely, if the called party has been afforded the number of allowable attempts, the process may proceed to block 99, where the IRS 34 routes the communication according to a default processing standard such as, for example, forwarding the communication to the called party's voice-mail messaging service.

At block 95, according to an embodiment using the above-described exemplary call processing instructions, if the DTMF decoder module 42 detects the character "1" or if the ASR module 44 detects the keyword "accept", the call processing module 40 may route the incoming call to the telephone 22 via the switch 12 and the subscriber line 20. Alternatively, if the DTMF decoder module 42 detects the character "2" or if the ASR module 46 detects the keyword "reject", the call processing module 40 may, for example, route the call at block 96 to the calling party (i.e., wireless telephone 70 or landline telephone 77) with an audible message stating, for example, that the called party/subscriber did not accept the call. In addition, if the IRS 34 detects the character "3" or the keyword "message", the call processing module 40 may route the call at block 96 to a voice messaging system associated with the called party/subscriber. Of course, for other embodiments of the present invention, the ASR module 46 may be programmed to recognize different predetermined keywords as call processing instructions, such as the words "one", "two", and "three".

According to other embodiments, the called party may be a user of the wireless telephone 70 and the calling party may be a user of the telephone 22 or the telephone 77. According to such an embodiment, the serving MSC 56 may detect a terminating trigger specific to the calling name service, causing the serving MSC 56 to send a query message to the SCP 60 at block 82. As discussed hereinbefore with respect to FIG. 4, the SCP 60 may then route the call to the IRS 34 (assuming the user of the wireless telephone 70 is a subscriber of the calling name service) to provide the calling name service with ASR capabilities according to the present invention.

According to another embodiment, the network 50 of FIG. 3 may be used to implement flexible call forwarding (FCF) services with ASR capabilities. The call forwarding feature permits the network 50, for example, to route an incoming call to the landline telephone 22 to a different directory number associated with the subscriber of the landline telephone 22, such as a wireless directory number, a business directory number, or a pager number. The FCF feature permits the subscriber to modify the call forwarding number to which the network 50 is to direct incoming calls for the subscriber.

Figure 5:
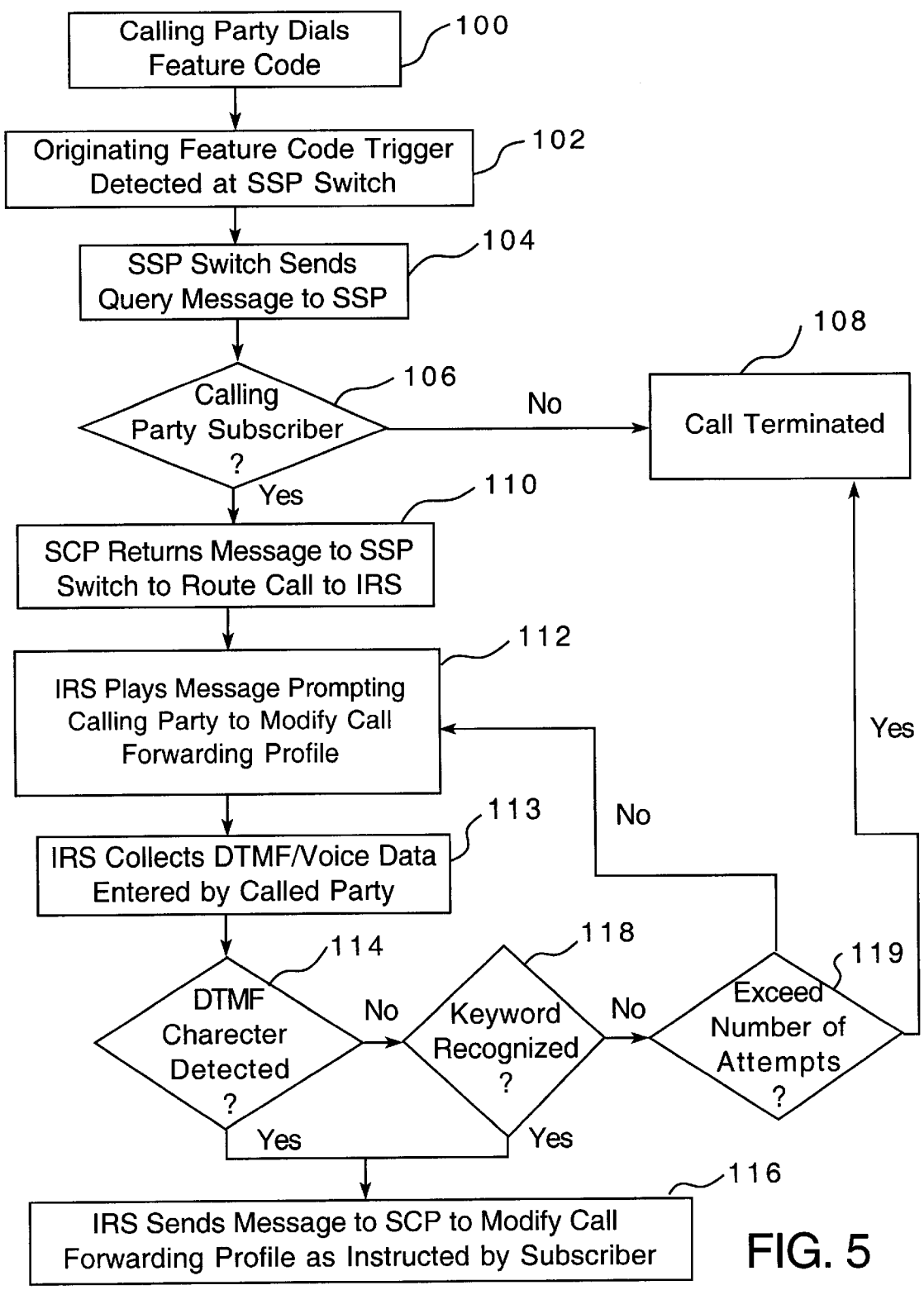
FIG. 5 is a block diagram illustrating a method of providing a flexible call forwarding service with speech recognition with the network of FIG. 3 according to one embodiment of the present invention.

FIG. 5 is a block diagram illustrating an embodiment of how the network 40 may be utilized to provide the FCF service with ASR functionality according to the present invention. The FCF service will be described as being initiated from a calling party using the telephone 22, although a user of the wireless telephone 70 may also benefit from the present invention, as described further hereinbelow. The illustrated process begins at block 100, where the calling party dials, from the telephone 22, a predefined feature code specific to the FCF service. The process continues to block 102, where the SSP switch 12 detects the feature code trigger. In response to the trigger, at block 104, the SSP switch 12 sends a query message to the SCP 28. The SCP 28 receives the query message from the SSP switch 12, and in response thereto, at block 106, interrogates the database 32 to determine if the calling party is a subscriber to the FCF service. According to another embodiment, at block 106 the SCP 28 may determine whether the calling party is a subscriber by prompting the calling party to enter a personal identification number (PIN) unique to the subscriber for the telephone 22.

If the calling party is not a subscriber to the FCF service, the process continues to block 108, whereupon the SCP 28 returns a message to the SSP switch 12 with instructions to terminate the call. On the other hand, if the calling party is a subscriber to the FCF service, the process continues to block 110, whereupon the SCP 28 returns a message to the SSP switch 12 with instructions to route the call to the IRS 34. The return message routed to the IRS 34 may include message fields which may include the subscriber's call forwarding profile.

From block 110, the process continues to block 112, where the call processing module 40 of the IRS 34 receives the communication, and in response thereto, the enunciation module 44 plays an audible message for the calling party/subscriber prompting the calling party/subscriber to input data relative to the current call forwarding profile. For example, the enunciation module 44 may play an audible message such as: "Incoming calls to [the directory number for the landline telephone 22] are currently being forwarded to [the subscriber's business telephone number]. To deactivate the call forwarding service, please press or speak 'one' now. To forward incoming calls to [the subscriber's wireless telephone number], please press or speak 'two' now. To forward incoming calls to [the subscriber's vacation home telephone number], please press or speak 'three' now." According to such an embodiment, the IRS 34 has knowledge of, for example, the directory numbers for the subscriber's business, wireless, and vacation home telephones. This knowledge may be conveyed to the IRS 34 from the database 32 with the return message sent from the SCP 28. Of course, the above-described exemplary message is but one example of the type of message the IRS 34 may play for the calling party/subscriber to realize the FCF service of the present invention. In addition, according to other embodiments, the message may prompt the calling party/subscriber to speak the word "business" to direct incoming calls to his business telephone and the word "wireless" to direct incoming calls to his wireless telephone. Additionally, according to another embodiment, the message played by the IRS 34 may allow the calling party/subscriber to enter a new directory number to which incoming calls are to be directed.

Having prompted the calling party/subscriber to modify the call forwarding data at block 112, the process continues to block 113, where the IRS collects the DTMF and/or voice data transmitted by the calling party in response to the message at block 112. According to one embodiment, IRS 34 may provide a time window in which the data is to be entered. Thereafter, the process advances to block 114, as discussed hereinbelow.

The process next proceeds to block 114, where the DTMF decoder module 42 of the IRS 34 determines whether the calling party/subscriber has dialed one of the requested characters. The DTMF decoder module 42 may determine whether the calling party/subscriber has dialed one of the requested characters based on, for example, dual tone multi-frequency (DTMF) signal decoding. If the IRS 34 detects of the requested characters, the process continues to block 116, at which the call processing module 40 of the IRS 34 returns a message to the SCP 28 to modify the subscriber's call forwarding data (or profile) in the database 32 in accordance with the instructions associated with the character entered by the calling party/subscriber.

Conversely, if at block 114 the IRS 34 does not detect one of the requested characters, the process continues to block 118, where ASR module 46 of the IRS 34 determines whether a predefined keyword was spoken by the calling party/subscriber in response to the message played at block 112. According to such an embodiment, the ASR module 46 may be programmed to recognize keywords such as, for example, "one", "two", "business", "wireless", "pager", etc. Such predefined keywords may be detected and recognized by the ASR module 46 as instructions to modify the subscriber's call forwarding profile. If the IRS 34 does detect a recognized keyword at block 118, the process flow continues to block 116, where the call processing module 40 sends a message to the SCP 28 to modify the subscriber's call forwarding data in the database 32 in accordance with the instructions associated with the recognized keyword spoken by the calling party/subscriber.

Conversely, if a keyword is not recognized at block 118, the process may continue to block 119, where the IRS 34 may determine whether the calling party has exceeded the number of allowable attempts to transmit an appropriate and identifiable response to the message played at block 1 12. If the calling party has exceeded the number of allowable attempts, the process may return to block 108, where the call processing module 40 sends a message to the SCP 28 to terminate the call. Conversely, if at block 119 it is determined that the number of allowable attempts has not been exceeded, rather than immediately terminating the call, the process may return to block 112, where the enunciation module 44 may replay the message for the calling party/ subscriber, hence re-prompting the calling party/subscriber to modify their call forwarding profile.

At block 116, according to an embodiment using the above-described exemplary FCF prompting message, if the IRS 34 detects the character "1" or the keyword "one", the IRS 34 may send a message to the SCP 28 to modify the subscriber's call forwarding data in the database 32 to deactivate the subscriber's call forwarding service, such that incoming calls to the calling party/subscriber are routed to the telephone 22. Alternatively, if the IRS 34 detects the character "2" or the keyword "two", the IRS 34 may, for example, send a message to the SCP 28 to modify the subscriber's call forwarding data in the database 32 to route incoming calls to the directory number for the subscriber's wireless telephone. Similarly, if the IRS 34 detects the character "3" or the keyword "three", the IRS 34 may, for example, send a message to the SCP 28 to modify the subscriber's call forwarding data in the database to route incoming calls to the directory number for the subscriber's vacation home telephone.

According to other embodiments, the calling party may be a user of the wireless telephone 70. According to such an embodiment, the serving MSC 56 may detect an originating trigger specific to the FCF service, causing the MSC 56 to send a query message to the SCP 60 at block 104. As discussed hereinbefore with respect to FIG. 5, the SCP 60 may then route the call to the IRS 34 (assuming the user of the wireless telephone 70 is a subscriber of the FCF service) via the tandem office 54 and the AIN 10 to provide the FCF service with ASR capabilities according to the present invention.

The network 50 of the present invention may also be utilized to provide the FCF service with ASR capability when a subscriber accesses the network 50 from a remote unit such as, for example, referring to FIG. 3, from the landline telephone 22, to modify the call forwarding profile associated with, for example, the wireless telephone 70 or the landline telephone 77. According to such an embodiment, the calling party may dial an administration number to remotely access the subscriber's call forwarding data. The SSP switch 12 may detect an originating trigger associated with the administration number, and in response thereto, send a query message to the SCP 28. To avoid unauthorized modification of a subscriber's call forwarding data, the SCP 28 may send a return message to the SSP switch 12 to route the call to the IRS 34. The call processing module 40 may receive the communication with instructions for the enunciation module 44 to play an audible message prompting the caller to enter a code, such as a personal identification number (PIN), to access the call forwarding data of the subscriber. A feature code trigger of the SSP switch 12 may detect the personal identification number dialed by the calling party, and the process of modifying the subscriber's call forwarding data pursuant to the FCF service using the ASR functionality of the present invention may continue as described hereinbefore with regard to FIG. 5 if the number entered by the calling party matches the PIN for the subscriber.

Similarly, a user of the wireless telephone 70 may remotely modify the call forwarding profile associated with, for example, the telephone 22 or another wireless telephone (not shown), by dialing an administration number. The serving MSC 56 may then detect an originating trigger associated with the administration number, and in response thereto, send a query message to the SCP 60. The SCP 60 may then route the call to the IRS 34 via the tandem office 54 to provide the FCF service with ASR capability of the present invention as described hereinbefore.

Figure 6:
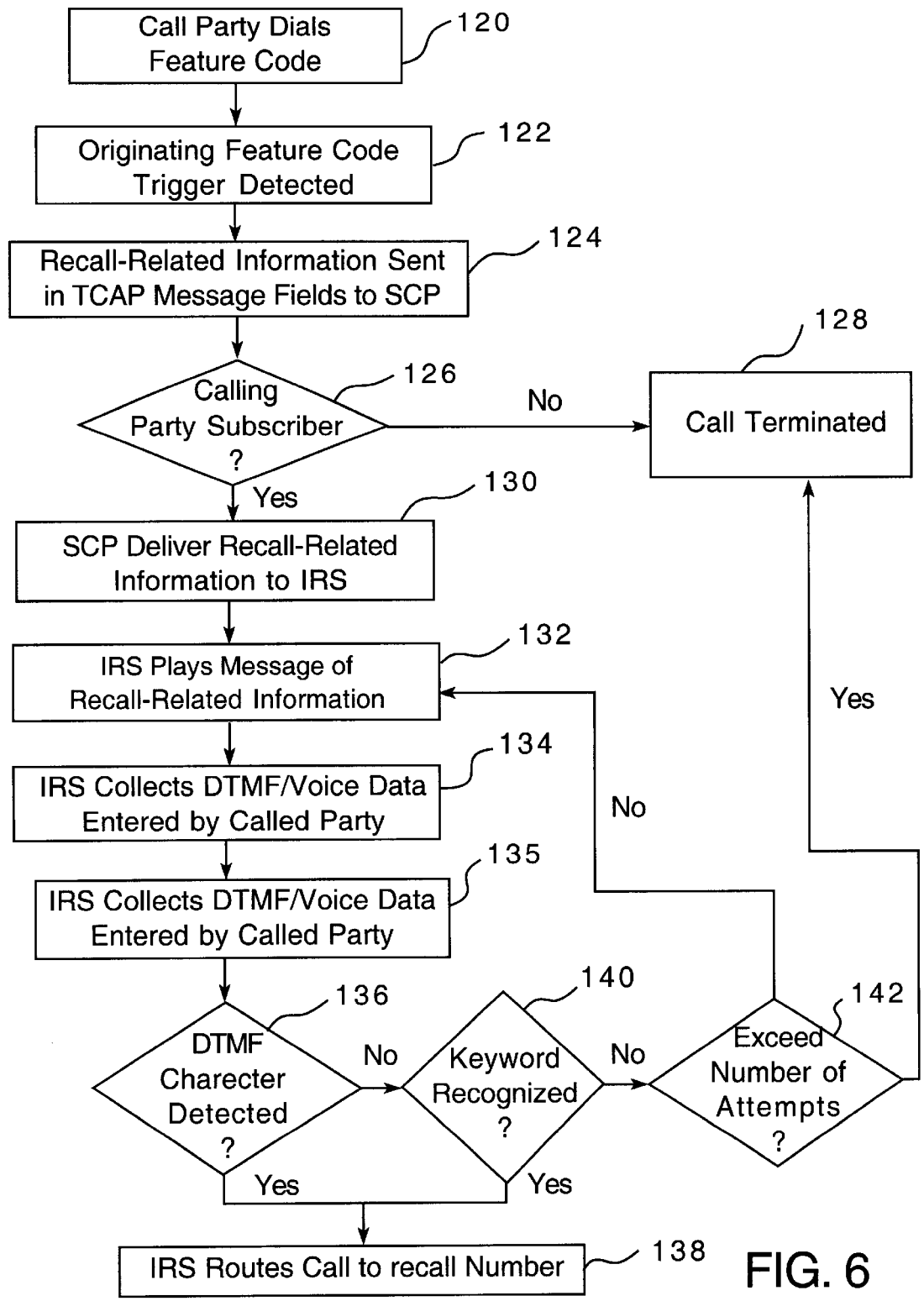
FIG. 6 is a block diagram illustrating a method of providing an automatic recall service with speech recognition with the network of FIG. 3 according to one embodiment of the present invention.

FIG. 6 is a block diagram of a method according to one embodiment for using the network 50 of the present invention for providing the automatic recall, or call return, feature with ASR functionality. The service will be described with reference to the network 50 illustrated in FIG. 3 wherein the called party is a user of the telephone 22, although, according to other embodiments, as described hereinbelow, the called party may be a user of the wireless telephone 70. The process begins at block 120, with the called party (i.e., a user of the telephone 22), dialing a feature code specific to the automatic recall service, such as "*69", to learn, for example, the name and telephone number of an immediately previous calling party. Prior to the called party dialing the feature code for the automatic recall service, therefore, it is assumed that a calling party, such as from the wireless telephone 70 or the landline telephone 77, placed a communication to the called party, which was routed according to conventional call processing logic to the SSP switch 12 servicing the called party, which stored automatic-recall related information such as, for example, a directory number of the calling party and a time stamp, in a line history block of the SSP switch 12. By dialing the feature code for the automatic recall service at block 120, the called party may seek to access the name and/or telephone number of the immediately previous calling party.

From block 120, the process continues to block 122, where an originating feature code trigger for the automatic recall service is detected by the SSP switch 12 servicing the telephone 22. After detection of the trigger, at block 124, the recall-related information stored in the line history block of the SSP switch 12 is embedded in a message, such as in a field of a TCAP message, and sent to the SCP 28. As described hereinbefore, the automatic recall-related information may include, for example, the directory number for the last incoming calling party and a time stamp of the communication.

From block 124, the process continues to block 126 where the SCP 28 determines whether the called party is a subscriber to the automatic recall service. According to one embodiment, the SCP 28 may determine whether the called party is a subscriber to the automatic recall service by interrogating the network database 32. If the called party is not a subscriber to the service, the process advances to block 128, where the SCP 28 returns a message to the SSP switch 12 to terminate the call. Conversely, if the called party is a subscriber, the process advances to block 130, where the SCP 28 delivers the automatic recall-related information to the IRS 34 along with instructions for the IRS 34 to apply the automatic recall service. According to another embodiment in which the automatic recall service is a pay per use service rather than a subscription service, the SCP 28 may write to the database 32 to charge the subscriber of the telephone 22 for accessing the automatic recall service. Thereafter, the SCP 28 may deliver the automatic recall-related information to the IRS 34 along with the instructions for the IRS 34 to apply the automatic recall service.

From block 130, the process continues to block 132 where the call processing module 40 of the IRS 34 receives the information from the SCP 28 and, in response thereto, the enunciation module 44 plays an audible message for the called party announcing, for example, the name and directory number of the last incoming calling party as well as the time of the communication. Then, at block 134, the enunciation module 44 may play an audible message prompting the called party to dial, for example, a character such as the character "1" or speak the word "one" to place an outgoing call to the directory number associated with the last incoming call.

From block 134, the process proceeds to block 135, where the IRS 34 collects the DTMF and/or voice data transmitted by the called party in response to the message played at block 134. According to one embodiment, IRS 34 may provide a time window in which the data is to be entered. Thereafter, the process advances to block 136, as discussed hereinbelow.

Next, the process proceeds to block 136, where the DTMF decoder module 42 of the IRS 34 detects whether the called party dialed the requested character in response to the prompting message. Thus, for the example described hereinbefore, the DTMF decoder module 42 may detect whether the called party dials the character "1" to instruct the network 50 to place a call to the last incoming calling party. The DTMF decoder module 42 may detect whether the proper character is dialed using Dual Tone MultiFrequency (DTMF) signal decoding. If the DTMF decoder module 42 does detect the dialing of the proper DTMF character, the process continues to block 138, where the call processing module 40 of the IRS 34 executes conventional call processing logic to place the call to the last incoming calling party.

Conversely, if at block 136 the IRS 34 does not detect the proper DTMF character, the process continues to block 140, where ASR module 46 of the IRS 34 determines whether a predefined keyword was spoken by the called party in response to the message played at block 134. According to such an embodiment, the ASR module 46 may be programmed to recognize certain keywords such as, for example, "one". Such predefined keywords may be detected and recognized by the IRS 34 as instructions to place a call to the last incoming caller. If the IRS 34 does detect a recognized keyword at block 140, the process flow continues to block 138, where the call processing module 40 of the IRS 34 executes conventional call processing logic to place the call to the last incoming calling party.

Conversely, if the predetermined keyword is not recognized at block 140, the process may continue to block 142, where the IRS 34 determines whether the called party has exceeded the number of allowable attempts permitted to transmit an appropriate and identifiable response in response to the message played at block 134. If the called party has exceed the number of allowable attempts, the process proceeds to block 128, where the IRS 34 terminates the call. Conversely, if the called party has not exceeded the number of allowable attempts, the process may return to block 134, where the messaging prompting the called party to dial the recalled number is replayed.

According to other embodiments, the called party may be a user of the wireless telephone 70. According to such an embodiment, the serving MSC 56 may detect an originating feature code trigger specific to the call return service dialed by the called party from the wireless telephone 70, causing the MSC 56 to send the recall-related information in, for example, TCAP message fields to the SCP 60. As discussed hereinbefore with respect to FIG. 6, the SCP 60 may then route the call to the IRS 34 via the tandem office 54 with the recall related information to provide the call return service with ASR capabilities according to the present invention.

According to another embodiment, the network 50 of the present invention may be utilized to provide call screening services such as, for example, the Privacy Director® call screening service available from BellSouth Corp., Atlanta, Ga. (Privacy Director® is a registered trademark of BellSouth Intellectual Property Corp.). Such a service works in conjunction with a caller identification unit which visually displays to a called party in real-time the name and telephone number of the calling party. According to the service, when a calling party has a blocked or unknown telephone number, the service answers the call and then gives the calling party the option of identifying itself to the called party. If the calling party chooses not to identify itself, the call is terminated without disturbing the called party (i.e., the subscriber of the service). On the other hand, if the calling party chooses to identify itself, then a call is placed to the called party identifying the name and telephone number of the calling party on the caller identification unit. The subscriber is then provided the option of taking the call or refusing the call. The caller identification unit may be, for example, an LCD display unit connected between the telephone drop of the customer premises and a landline telephone, or the display unit may be integrated with the calling device, such as an LCD display on a wireless telephone.

Figure 7:
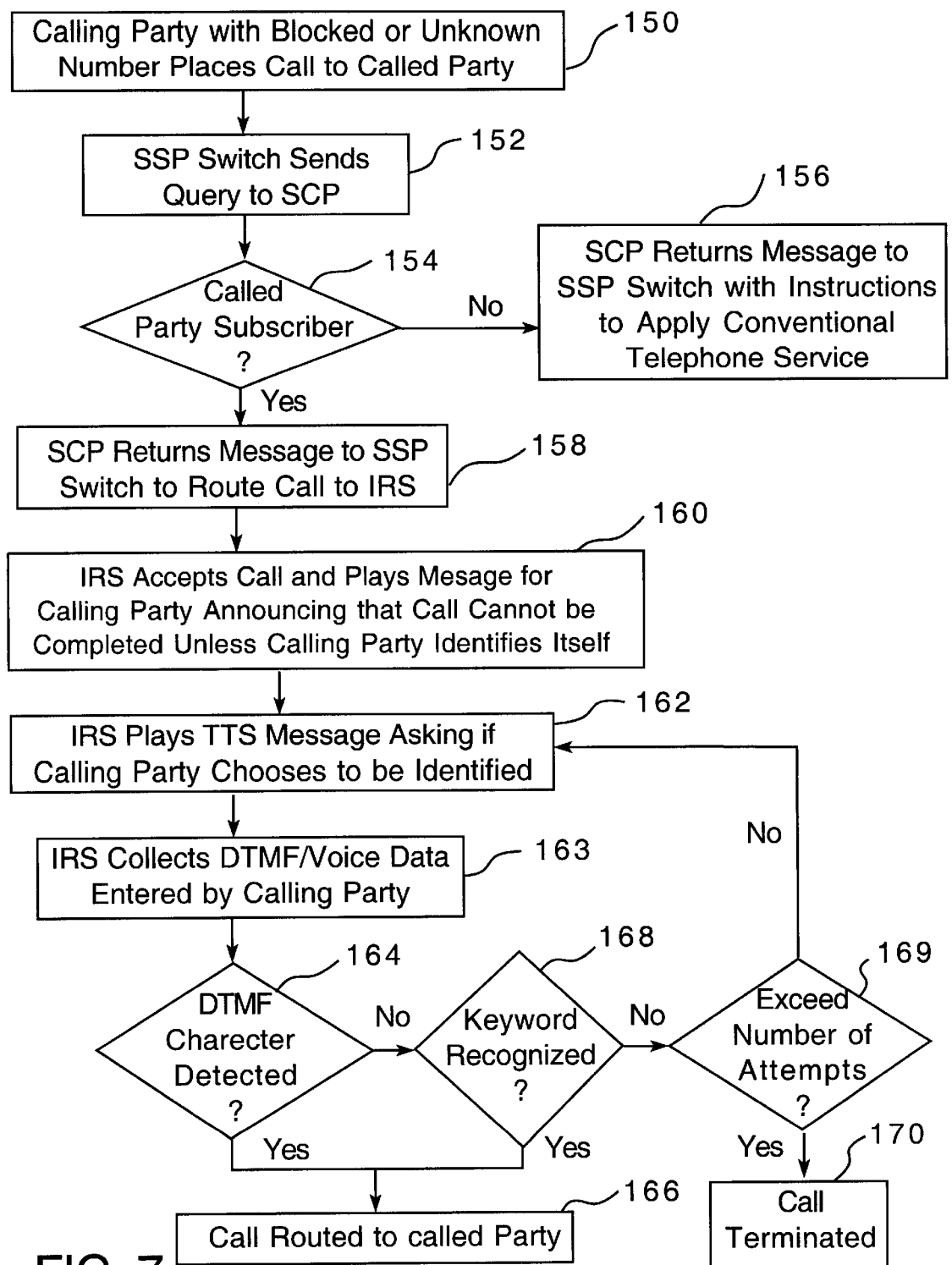
FIG. 7 is a block diagram illustrating a method of providing a call screening service with speech recognition with the network of FIG. 3 according to one embodiment of the present invention.

FIG. 7 is block diagram of a method according to one embodiment for using the network 50 of the present invention to provide call screening services with ASR capabilities. The service will be described with reference to FIG. 3 wherein the calling party is a user of the wireless telephone 70 or the landline telephone 77, and the called party is a user of the landline telephone 22, however, according to other embodiments, as described hereinbelow, the calling party may be a user of the telephone 22, and the called party may be a user of the wireless telephone 70. The process starts at block 150, with the calling party, who has a blocked or unknown number with respect to caller identification units, placing a call to a called party (the telephone 22). Calls from either the wireless telephone 70 or the landline telephone 77 are routed by the tandem office 54 to the SSP switch 12 of the AIN 10 according to conventional call processing. A terminating trigger at the SSP switch 12 specific to the call screening service is detected, causing the SSP switch 12 to send a query message to the SCP 28 at block 152. The query message may be, for example, a terminating attempt trigger (TAT) query message.

At block 154, in response to the query message from the SSP switch 12, the SCP 28 may interrogate the network database 32 as to whether the called party is a subscriber to the call screening service. If the called party is not a subscriber, the process proceeds to block 156, where the SCP 28 returns a message to the SSP switch 12 with instructions to apply conventional telephone services. In this situation, the call from the calling party may be routed in a conventional fashion to the called party. If, however, the called party is a subscriber, the process proceeds to block 158, where the SCP 28 returns a message to the SSP switch 12 with instructions to route the call to the IRS 34 of the AIN 10.

At block 160, the call processing module 40 of the IRS 34 accepts the call and the enunciation module 44 plays an audible message to the calling party (i.e., a user of either the wireless telephone 70 or the landline telephone 77) announcing, for example, that the call cannot be complete unless that calling party is identified.

Thereafter, at block 162, the enunciation module 44 may play an audible message for the calling party asking if the calling party chooses to identify itself to the called party/subscriber. For example, the enunciation module 44 may play a message such as: "Press or speak 'one' now if you wish to provide your name and/or telephone number to the called party. Otherwise, if you wish to terminate the call, please hang up." In addition, if the calling party's number is unknown to the network 50, the enunciation module 44 may prompt the calling party to enter its phone number in order that this information may be provided to the subscriber/called party.

Having asked the calling party to identify itself, the process continues to block 163 where the IRS 34 collects the DTMF and/or voice data transmitted by the calling party in response to the message played at block 162. According to one embodiment, IRS 34 may provide a time window in which the data is to be entered. Thereafter, the process advances to block 164, as discussed hereinbelow.

From block 163, the process advances to block 164, where the DTMF decoder module 42 of the IRS 34 determines whether the called party has dialed the requested character. The DTMF decoder module 42 may determine whether the subscriber has dialed the requested character based on, for example, dual tone multi-frequency (DTMF) signal decoding. If the DTMF decoder module 42 detects the requested character, the process continues to block 166, where the call processing module 40 of the IRS 34 routes the call to the called party/subscriber, allowing the name and/or telephone number of the calling party to be displayed on the caller identification unit of the called party/subscriber, who thereafter may choose whether or not to answer the call. Where the called party/subscriber also subscribes to the calling name service, such as described hereinbefore with respect to FIG. 4, the called party/subscriber may exercise his options with respect to the call by voicing commands to the IRS 34 which are recognized by the ASR module 46.

Conversely, if at block 164 the DTMF decoder module 42 does not detect the requested character, the process continues to block 168, where ASR module 46 of the IRS 34 determines, for example, whether a predefined keyword was spoken by the called party in response to the message played at block 162. According to such an embodiment, the ASR module 46 may be programmed to recognize keywords such as, for example, "one" which may be detected and recognized by the ASR module 46 as call processing instructions. If the ASR module 46 does detect a recognized keyword at block 98, the process flow continues to block 166, where the call processing module 40 routes the call to the called party. Conversely, if a keyword is not recognized at block 168, the process continues to block 169, where the IRS 34 determines whether the calling party has exceeded the number of allowable attempts necessary to transmit an appropriate and identifiable response in response to the message played at block 162. If the calling party has exceeded the number of allowable attempts, the process proceeds to block 170, where the call is terminated. Conversely, if at block 169 it is determined that the calling party has not exceeded the number of allowable attempts, the process returns to block 162, where the prompting message may be re-played for the calling party.

According to other embodiments of the present invention, the ASR module 46 may be programmed to recognize different predetermined keywords as call processing instructions such as, for example, the words "yes", "no", or "hang-up."

According to other embodiments, the called party may be a user of the wireless telephone 70 and the calling party may be a user of the telephone 22 or the telephone 77. The serving MSC 56 may detect a terminating trigger specific to the called party for the call screening service, causing the MSC 56 to send a query message to the SCP 60 at block 152. The query message may be, for example, a terminating attempt trigger (TAT) query message. As discussed hereinbefore with respect to FIG. 7, the SCP 60 may then route the call to the IRS 34 (assuming the user of the wireless telephone 70 is a subscriber of the call screening service) via the tandem office 54 to provide the calling name service with ASR capabilities according to the present invention.

According to another embodiment, the network 50 of FIG. 3 may be used to implement name and number delivery (NND) services with ASR capabilities. The NND service permits a calling party to access the name and telephone number of another party. The party about whom the information is requested may have the same local exchange carrier (LEC) as the calling party, or it may have a different LEC. The service is typically activated by the calling party dialing a feature code, such as "411", which is detected by the AIN 10 or the wireless network 52. Upon detection of the feature code, the call is routed to an Operator Services System (OPSS) (not shown). The OPSS typically includes one or more elements that serve as part of the infrastructure generally used by an LEC in the provision of directory assistance services. The OPSS may be included as part of an LEC CO or other network elements with the appropriate functional connections.

The OPSS is typically functionally connected to one or more computer terminals staffed by directory assistance operators. Once the call is routed to the OPSS, the calling party is generally asked to audibly identify the name and location of the party whose telephone number is being requested. With the name and location information, the OPSS directory assistance operators query network databases to determine the requested telephone number. The information is then provided audibly to the calling party.

Figure 8:
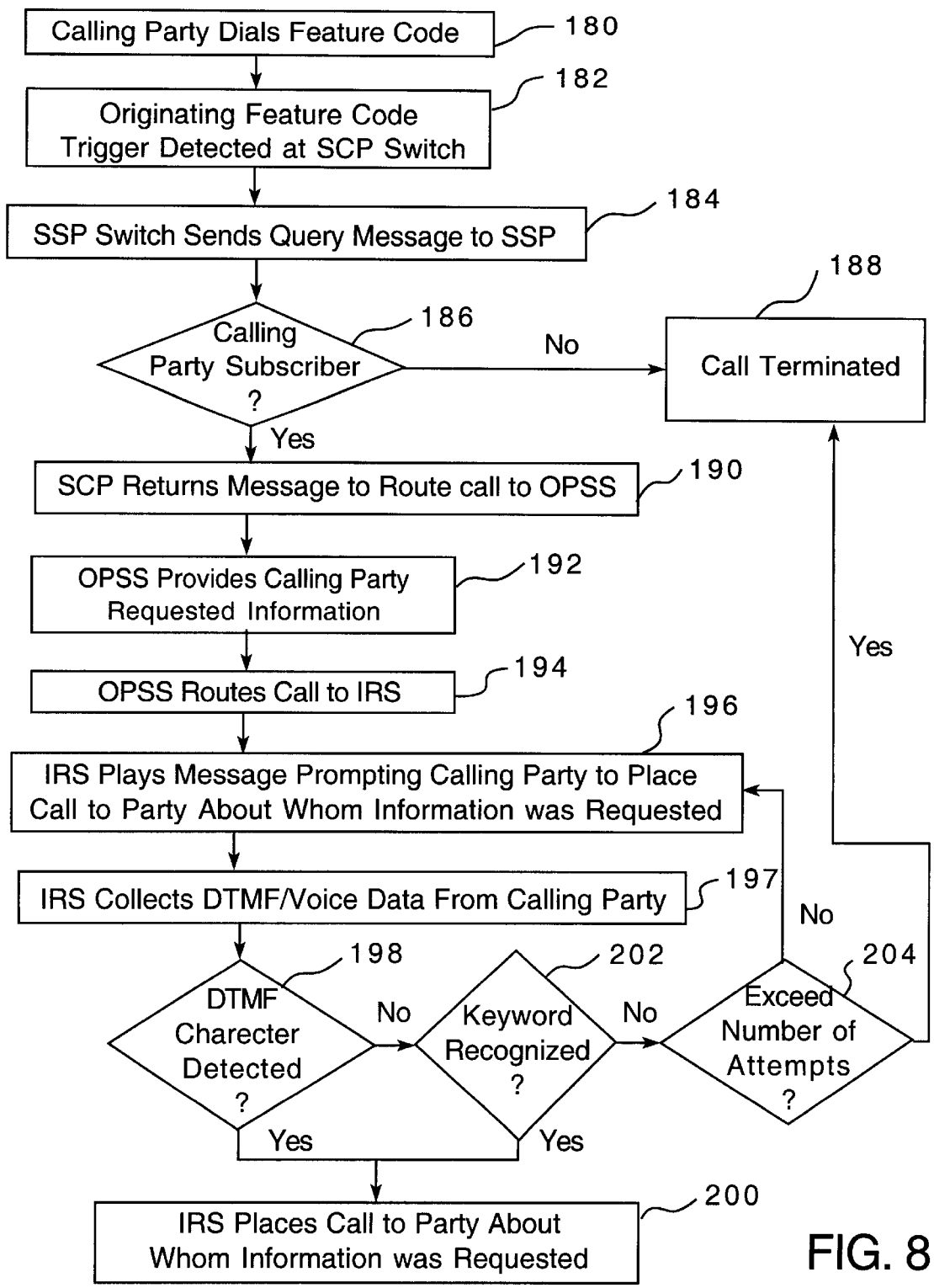
FIG. 8 is a block diagram illustrating a method of providing a name and number delivery service with speech recognition with the network of FIG. 3 according to one embodiment of the present invention.

FIG. 8 is a block diagram illustrating an embodiment of how the network 50 may be utilized to provide the NND service with ASR functionality. The service will be described with respect to a call initiated from the telephone 22, although a user of the wireless telephone 70 may also benefit from the present invention, as described further hereinbelow. The illustrated process begins at block 180, where the calling party dials a predefined feature code specific to the NND service, such as "411", from the telephone 22. The process continues to block 182, where the SSP switch 12 detects a feature code trigger associated with the NND service for the subscriber line 20 associated with the calling party. In response to the trigger, at block 184, the SSP switch 12 sends a query message to the SCP 28.

The SCP 28 receives the query message from the SSP switch 12, and in response thereto, at block 186, interrogates the database 32 to determine if the calling party is a subscriber to the NND service. If the called party is not a subscriber to the service, the process advances to block 188, where the SCP 28 returns a message to the SSP switch 12 to terminate the call. Conversely, if the called party is a subscriber, the process advances to block 190, where the SCP 28 returns a message to the SSP switch 12 to route the call to the OPSS (not shown). According to another embodiment in which the NND service is a pay-per-use service rather than a subscription service, the SCP 28 may write to the database 32 to charge the subscriber of the telephone 22 for accessing the NND service. Thereafter, the SCP 28 returns a message to the SSP switch 12 to route the call to the OPSS.

Once the call is routed to the OPSS, at block 192, the calling party is then provided the telephone number of the party about whom the information is requested. U.S. Pat. No. 5,940,493, entitled "System and Method For Providing Directory Assistance Information," which is incorporated herein by reference, discloses one system and method for providing directory assistance information from an OPSS. From block 192, once the calling party has been provided the directory assistance information, the process advances to block 194 where the call is routed by the AIN 10 from the OPSS to the IRS 34 with a message containing the requested telephone number.

From block 194, the process continues to block 196, where the call processing module 40 of the IRS 34 receives the communication and the message from the OPSS, and in response thereto, the enunciation module 44 plays an audible message for the calling party prompting the calling party to place an outgoing call to the party about whom the directory assistance information was requested. For example, the enunciation module 44 may play an audible message such as: "If you wish to place a call to this party, please press or speak 'one' now." Of course, this exemplary message is but one example of the type of message the IRS 34 may play for the subscriber to realize the NND service of the present invention.

Having prompted the calling party to place an outgoing call to the party about whom the information was requested at block 196, the process continues to block 197, where the IRS collects the DTMF and/or voice data transmitted by the calling party in response to the message played at block 196. According to one embodiment, IRS 34 may provide a time window in which the data is to be entered. Thereafter, the process advances to block 198, as discussed hereinbelow.

From block 197, the process advances to block 198 where the DTMF decoder module 42 DTMF decoder module 42 may determine whether the subscriber has dialed one of the requested characters based on, for example, dual tone multi-frequency (DTMF) signal decoding. If the IRS 34 detects the requested character, the process continues to block 200, at which the call processing module 40 of the IRS 34 executes conventional call processing logic to place the outgoing call.

Conversely, if at block 198 the IRS 34 does not detect the requested character, the process continues to block 202, where the ASR module 46 of the IRS 34 determines whether a predefined keyword was spoken by the calling party in response to the message played at block 196. According to such an embodiment, the ASR module 46 may be programmed to recognize keywords such as, for example, "one". Such predefined keywords may be detected and recognized by the ASR module 46 as instructions to place the outgoing call to the party about whom the information was requested. If the IRS 34 does detect a recognized keyword at block 202, the process flow continues to block 200, where the call processing module 40 executes conventional call processing logic to place the outgoing call.

Conversely, if a keyword is not recognized at block 202, the process advances to block 204, where the IRS 34 determines whether the calling party has exceeded the number of allowable attempts necessary to transmit an appropriate and identifiable response in response to the message played at block 196. If the calling party has exceeded the number of allowable attempts, the process proceeds to block 188, where the call processing module 40 terminates the call. Conversely, if the calling party has not exceeded the number of allowable attempts, the process may return to block 196, where the message prompting the calling party to place the outgoing call is replayed.

According to other embodiments, the calling party accessing the NND service may be a user of the wireless telephone 70. According to such an embodiment, the serving MSC 56 may detect the feature code trigger specific to the NND service, causing the MSC 56 to send a query message to the SCP 60 at block 184. As discussed hereinbefore with respect to FIG. 8, the SCP 60 may then route the call to the OPSS to provide the calling party with the requested directory assistance information. The call may then be routed from the OPSS to the IRS 34 with a message containing the requested telephone number to provide the NND service with the ASR functionality of the present invention, as described hereinbefore.

According to another embodiment, the network 50 of FIG. 3 may be used to implement a subscriber interface with ASR capabilities for the simultaneous ring (SR) service. The SR service is an enhanced calling feature which causes a subscriber's landline and wireless telephones to ring simultaneously in response to an incoming call to the subscriber. Consequently, the subscriber could answer the incoming call with either the landline telephone or the wireless telephone, depending on which is more convenient for the subscriber. A subscriber interface for the service permits the subscriber to, for example, activate or deactivate the service.

Figure 9:
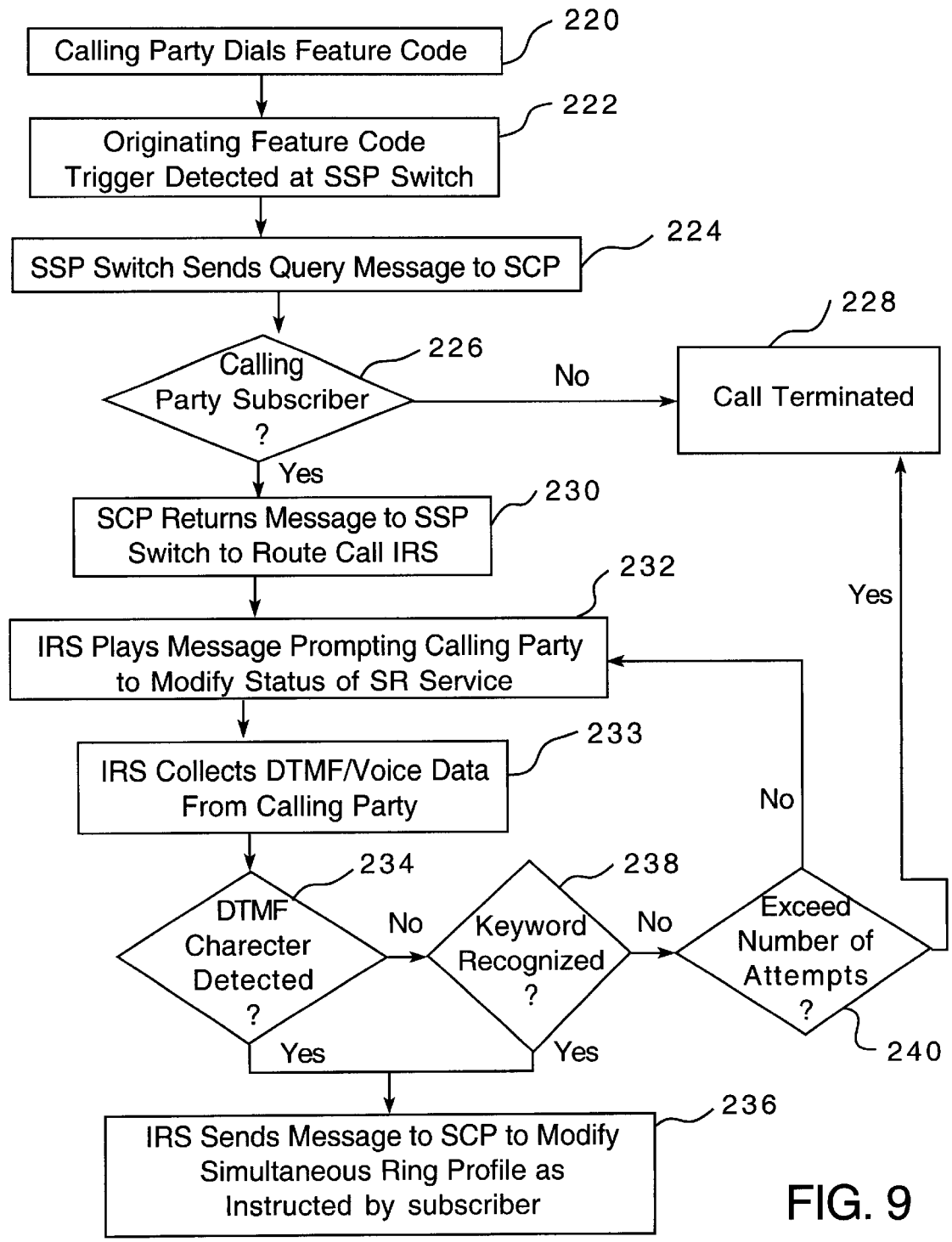
FIG. 9 is a block diagram illustrating a method of providing a subscriber interface for a simultaneous ring service with speech recognition with the network of FIG. 3 according to one embodiment of the present invention.

FIG. 9 is a block diagram illustrating an embodiment of how the network 40 may be utilized to provide a subscriber interface with ASR functionality for the SR service. The service will be described as being initiated by a communication from the telephone 22, although a user of the wireless telephone 70 may also benefit from the present invention, as described further hereinbelow. The illustrated process begins at block 220, where the calling party dials a predefined feature code specific to the subscriber interface for the SR service from the telephone 22. The process continues to block 222, where the SSP switch 12 detects the feature code trigger associated with the service for the subscriber line 20 for the calling party. In response to the trigger, at block 224, the SSP switch 12 sends a query message to the SCP 28. The SCP 28 receives the query message from the SSP switch 12, and in response thereto, at block 226, interrogates the database 32 to determine if the calling party is a subscriber to the SR service. According to another embodiment, at block 226 the SCP 28 may determine whether the calling party is a subscriber to the service by prompting the calling party to enter a personal identification number (PIN) unique to the subscriber for the telephone 22.

If the calling party is not a subscriber to the SR service, the process continues to block 228, whereupon the SCP 28 returns a message to the SSP switch 12 with instructions to terminate the call. On the other hand, if the calling party is a subscriber to the SR service, the process continues to block 230, whereupon the SCP 28 returns a message to the SSP switch 12 with instructions to route the call to the IRS 34. The message to the IRS 34 may include a message field indicating whether the subscriber's SR service is currently activated.

From block 230, the process continues to block 232, where the call processing module 40 of the IRS 34 receives the communication, and in response thereto, the enunciation module 44 plays an audible message for the calling party/subscriber prompting the calling party/subscriber to, for example, activate or deactivate the SR service. For example, the enunciation module 44 may play an audible message such as: "The simultaneous ring service is currently deactivated (or activated). If you wish to activate (or deactivate) the service, please press or speak 'one' now. If you wish to keep the service deactivated (or activated), please press or speak 'two' now." Of course, the above-described exemplary message is but one example of the type of message the IRS 34 may play for the subscriber to realize the subscriber interface for the SR service of the present invention. In addition, the message may, for example, permit the subscriber to enter the telephone number for a different wireless telephone to be rung simultaneously with the subscriber's landline telephone.

Having prompted the calling party/subscriber to activate or deactivate the SR service at block 232, the process continues to block 233, where the IRS collects the DTMF and/or voice data transmitted by the calling party in response to the message played at block 232. According to one embodiment, IRS 34 may provide a time window in which the data is to be entered. Thereafter, the process advances to block 234, as discussed hereinbelow.

From block 233, the process proceeds to block 234 where the DTMF decoder module 42 of the IRS 34 determines whether the calling party/subscriber has dialed one of the requested characters. The DTMF decoder module 42 may determine whether the calling party/subscriber has dialed one of the requested characters based on, for example, dual tone multi-frequency (DTMF) signal decoding. If the IRS 34 detects the requested digits, the process continues to block 236, at which the call processing module 40 of the IRS 34 returns a message to the SCP 28 to modify the status of the subscriber's SR service in accordance with the instructions associated with the DTMF character entered by the calling party/subscriber.

Conversely, if at block 234 the IRS 34 does not detect one of the requested characters, the process continues to block 238, where ASR module 46 of the IRS 34 determines whether a predefined keyword was spoken by the calling party/subscriber in response to the message played at block 232. According to such an embodiment, the ASR module 46 may be programmed to recognize keywords such as, for example, "one" or "two", etc. Such predefined keywords may be detected and recognized by the ASR module 46 as instructions to modify the status of the subscriber's SR service. If the IRS 34 does detect a recognized keyword at block 238, the process flow continues to block 236, where the call processing module 40 sends a message to the SCP 28 to modify the status of the subscriber's SR service in accordance with the instructions associated with the recognized keyword spoken by the calling party/subscriber.

Conversely, if a keyword is not recognized at block 238, the process may continue to block 240, where the IRS 34 determines whether the calling party has exceeded the number of allowable attempts necessary to transmit an appropriate and identifiable response in response to the message played at block 232. If the calling party has exceeded the number of allowable attempts, the process proceeds to block 228, where the call processing module 40 terminates the call. Conversely, if the calling party has not exceeded the number of allowable attempts, the process may return to block 232, where the enunciation module 44 may replay the message for the calling party/subscriber, hence re-prompting the calling party/subscriber to modify the status of the SR service.

According to other embodiments, the calling party may be a user of the wireless telephone 70. According to such an embodiment, the serving MSC 56 may detect a feature code trigger specific to the subscriber interface for SR service, causing the MSC 56 to send a query message to the SCP 60 at block 224. As discussed hereinbefore with respect to FIG. 9, the SCP 60 may then route the call to the IRS 34 (assuming the calling party is a subscriber of the SR service) via the tandem office 54 and the AIN 10 to provide the subscriber interface for the SR service with ASR capabilities according to the present invention.

The network 50 of the present invention may also be utilized to provide the subscriber interface with ASR capability when a subscriber accesses the network 50 from a remote unit such as, for example, referring to FIG. 3, from the landline telephone 22, to modify the status of the SR service associated with, for example, the wireless telephone 70 and the landline telephone 77. According to such an embodiment, the calling party may dial from the telephone 22 an administration number for remotely accessing the subscriber interface for the SR service. The SSP switch 12 may detect an originating trigger associated with the administration number, and in response thereto, send a query message to the SCP 28. To avoid unauthorized modification of the status of a subscriber's SR service, the SCP 28 may send a return message to the SSP switch 12 to route the call to the IRS 34. The call processing module 40 may receive the communication with instructions for the enunciation module 44 to play an audible message prompting the caller to enter a code, such as a personal identification number (PIN), to access the subscriber interface. A feature code trigger of the SSP switch 12 may detect the code dialed by the calling party, and the process of modifying the status of the subscriber's SR service using the ASR functionality of the present invention may continue as described hereinbefore with regard to FIG. 9 if the code entered by the calling party matches the subscriber's PIN.

Similarly, a user of the wireless telephone 70 may remotely modify the status of the SR service associated with, for example, the telephone 22 or another wireless telephone (not shown), by dialing an administration number. The serving MSC 56 may then detect an originating trigger associated with the administration number, and in response thereto, send a query message to the SCP 60. The SCP 60 may then route the call to the IRS 34 via the tandem office 54 to provide the subscriber interface with ASR capability as described hereinbefore.

Although the present invention has been described herein with respect to certain embodiments, those of ordinary skill in the art will recognize that many modifications and variations of the present invention may be implemented. For example, for the methods illustrated in FIGS. 4–9, the IRS 34 may determine a predetermined keyword was spoken by the party prior to detecting whether the requested DTMF was entered. In addition, for the NND service described hereinbefore with respect to FIG. 8, the ASR module 46 may be incorporated with the OPSS, rather than routing the call from the OPSS to the IRS 34. The foregoing description and the following claims are intended to cover all such modifications and variations.

What is claimed is:

1. A network for providing a telecommunications service with automatic speech recognition to a telecommunications user, comprising:

a switch in communication with a telecommunications device associated with the telecommunications user for storing an identifying information regarding a prior calling party to the telecommunications user, and for detecting a trigger specific to the telecommunications service in response to a communication from the telecommunications device; and an intelligent resource server in communication with the switch, wherein the intelligent resource server is for:
receiving from the switch the communication from the telecommunications device and a message including the identifying information;
playing an audible message for the telecommunications user in response to receiving the communication;
automatically recognizing a predetermined keyword spoken by the telecommunications user in response to the audible message; and for placing the outgoing communication to the prior calling party based on recognition of the predetermined keyword, wherein the audible message contains the identifying information regarding the prior calling party and prompts the telecommunications user to place an outgoing communication to the prior calling party.

2. The network of claim 1, wherein the switch includes a switch of a central office in communication with the telecommunications device via a subscriber line.

3. The network of claim 1, wherein the switch includes a switch of a mobile switching center in communication with the telecommunications device via an air-interface communication scheme.

4. The network of claim 1, wherein the switch detects an originating trigger in response to a feature code entered by the telecommunications user from the telecommunications device.

5. The network of claim 1, further comprising a service control point in communication with the switch.

6. The network of claim 1, wherein the intelligent resource server is further for placing the outgoing communication to the prior calling party based on recognition of a predetermined DTMF character entered by the telecommunications user.

7. A network for providing a telecommunications service with automatic speech recognition to a telecommunications user, comprising:
a switch in communication with a telecommunications device associated with the telecommunications user for storing identifying information regarding a prior calling party to the telecommunications user, and for detecting a trigger specific to the telecommunications service in response to a communication from the telecommunications device;
a call processing module in communication with the switch, wherein the call processing module is for:
receiving from the switch the communication from the telecommunications device and a message including the identifying information; and for
placing an outgoing communication to the prior calling party;
an enunciation module in communication with the call processing module for playing an audible message for the telecommunications user in response to receiving the communication, the audible message containing the information regarding the prior calling party and prompting the telecommunications user to place the outgoing communication to the prior calling party; and
an automatic speech recognition module in communication with the switch for recognizing a predetermined keyword spoken by the telecommunications user in response to the audible message, wherein the call processing module places the outgoing communication to the prior calling party based on recognition of the predetermined keyword.

8. The network of claim 7, wherein the switch includes a switch of a central office in communication with the telecommunications device via a subscriber line.

9. The network of claim 7, wherein the switch includes a switch of a mobile switching center in communication with the telecommunications device via an air-interface communication scheme.

10. The network of claim 7, wherein the switch is further for detecting an originating trigger in response to a feature code entered by the telecommunications user from the telecommunications device.

11. The network of claim 7, further comprising a service control point in communication with the switch.

12. The network of claim 7, further comprising a DTMF decoder module in communication with the switch for recognizing a predetermined DTMF character entered by the telecommunications user in response to the audible message.

13. The network of claim 12, wherein the call processing module is further for placing the outgoing communication to the prior calling party based on recognition of the predetermined DTMF character by the DTMF decoder module.

14. An intelligent resource server for providing a telecommunications service with automatic speech recognition for a telecommunications user, comprising:
a call processing module, wherein the call processing module is for:
receiving from a switch in communication with a telecommunications device associated with the telecommunications user a communication from the telecommunications device and a message including identifying information relating to a prior calling party; and for
placing an outgoing communication to the prior calling party;
an enunciation module in communication with the call processing module for playing an audible message for the telecommunications user in response to receiving the communication, the audible message containing the information regarding the prior calling party and prompting the telecommunications user to place the outgoing communication to the prior calling party; and
an automatic speech recognition module in communication with the switch for recognizing a predetermined keyword spoken by the telecommunications user in response to the audible message, wherein the call processing module places the outgoing communication to the prior calling party based on recognition of the predetermined keyword.

15. The intelligent resource server of claim 14, further comprising a DTMF decoder module in communication with the switch for recognizing a predetermined DTMF character entered by the telecommunications user in response to the audible message.

16. The network of claim 15, wherein the call processing module is further for placing the outgoing communication to the prior calling party based on recognition of the predetermined DTMF character by the DTMF decoder module.

17. A method for providing a telecommunications service with automatic speech recognition to a telecommunications user, comprising:
detecting a communication from the telecommunications user;
playing an audible message for the telecommunications user in response to detection of the communication, the audible message containing identifying information regarding a prior calling party and prompting the telecommunications user to place an outgoing communication to the prior calling party;
recognizing a predetermined keyword spoken by the telecommunications user in response to the audible message; and
placing the outgoing communication to the prior calling party based on recognition of the predetermined keyword.

18. The method of claim 17, further comprising recognizing a predetermined DTMF character entered by the telecommunications user in response to the audible message.

19. The method of claim 17, further comprising placing the outgoing communication to the prior calling party based on recognition of the predetermined DTMF character.

20. A network for providing a telecommunications service with automatic speech recognition to a telecommunications user, comprising:

means for detecting a communication from the telecommunications user;

means for playing an audible message for the telecommunications user in response to detection of the communication, the audible message containing identifying information regarding a prior calling party and prompting the telecommunications user to place an outgoing communication to the prior calling party;

means for recognizing a predetermined keyword spoken by the telecommunications user in response to the audible message; and means for placing the outgoing communication to the prior calling party based on recognition of the predetermined keyword.

21. The network of claim 20, further comprising means for recognizing a predetermined DTMF character entered by the telecommunications user in response to the audible message.

22. The network of claim 21, further comprising means for placing the outgoing communication to the prior calling party based on recognition of the predetermined DTMF character.

23. The network of claim 20, further comprising means for storing the identifying information regarding a prior calling party.

* * * * *

UNITED STATES PATENT AND TRADEMARK OFFICE
CERTIFICATE OF CORRECTION

PATENT NO. : 6,505,163 B1
DATED : January 7, 2003
INVENTOR(S) : Zeeman Zhang and Joseph Knoerle It is certified that error appears in the above-identified patent and that said Letters Patent is hereby corrected as shown below:

Column 25,
Line 1, delete "claim 17", and substitute therefore -- claim 18 --.

Signed and Sealed this

Twentieth Day of January, 2004

JON W. DUDAS
*Acting Director of the United States Patent and Trademark Office*